(12) United States Patent
Yang et al.

(10) Patent No.: US 10,135,818 B2
(45) Date of Patent: Nov. 20, 2018

(54) USER BIOLOGICAL FEATURE AUTHENTICATION METHOD AND SYSTEM

(71) Applicant: BEIJING TECHSHINO TECHNOLOGY CO., LTD., Beijing (CN)

(72) Inventors: Chunlin Yang, Beijing (CN); Jun Zhou, Beijing (CN); Fushui Yu, Beijing (CN); Chengkun Shan, Beijing (CN)

(73) Assignee: Beijing Techshino Technology Co., Ltd., Beijing (CN)

( * ) Notice: Subject to any disclaimer, the term of this patent is extended or adjusted under 35 U.S.C. 154(b) by 231 days.

(21) Appl. No.: 15/107,080

(22) PCT Filed: Feb. 6, 2015

(86) PCT No.: PCT/CN2015/072448
§ 371 (c)(1),
(2) Date: Jun. 21, 2016

(87) PCT Pub. No.: WO2015/135406
PCT Pub. Date: Sep. 17, 2015

(65) Prior Publication Data
US 2017/0118205 A1    Apr. 27, 2017

(30) Foreign Application Priority Data
Mar. 12, 2014  (CN) .......................... 2014 1 0090623

(51) Int. Cl.
*H04L 29/06* (2006.01)
*H04L 9/32* (2006.01)
(Continued)

(52) U.S. Cl.
CPC ........ *H04L 63/0861* (2013.01); *H04L 9/3231* (2013.01); *H04L 9/3268* (2013.01);
(Continued)

(58) Field of Classification Search
None
See application file for complete search history.

(56) References Cited

U.S. PATENT DOCUMENTS

| | | | |
|---|---|---|---|
| 9,443,514 B1* | 9/2016 | Taubman | ................ G10L 15/22 |
| 2007/0036289 A1* | 2/2007 | Fu | ...................... G07C 9/00158 |
| | | | 379/88.02 |

(Continued)

FOREIGN PATENT DOCUMENTS

| CN | 101075868 A | 11/2007 |
|---|---|---|
| CN | 103475490 A | 12/2013 |

(Continued)

OTHER PUBLICATIONS

Search Report dated Feb. 22, 2017 in connection with Chinese Patent Application No. 2014100906232, 1 page.

*Primary Examiner* — Malcolm Cribbs
(74) *Attorney, Agent, or Firm* — Dorsey & Whitney LLP

(57) ABSTRACT

The disclosure discloses a user biological feature authentication method and system. The method includes the following: a client sends an authentication request to a server; the client receives a speech password; acquires speech information and a face image of a user to be authenticated; the client judges whether the speech information is the same as the speech password, and judges whether the face image is valid; the client associates a speech information fragment to the face image under the condition that a judgment result is YES; the client calculates a digest value of the speech password, the speech information, a target image, associated information and a first moment; and the client sends an authentication content to the server. By the disclosure, the effect of improving ID authentication security in a biological feature recognition process is further achieved.

16 Claims, 5 Drawing Sheets

(51) Int. Cl.
*H04W 12/06* (2009.01)
*G06F 21/32* (2013.01)

(52) U.S. Cl.
CPC ........ *H04L 63/083* (2013.01); *H04L 63/0884* (2013.01); *H04W 12/06* (2013.01); *G06F 21/32* (2013.01); *H04L 2463/082* (2013.01)

(56) References Cited

U.S. PATENT DOCUMENTS

| | | | | |
|---|---|---|---|---|
| 2008/0181403 | A1* | 7/2008 | Sakamoto | H04L 9/3236 380/258 |
| 2010/0042848 | A1* | 2/2010 | Rosener | G06F 21/32 713/184 |
| 2013/0282588 | A1* | 10/2013 | Hruska | G06Q 20/10 705/67 |
| 2014/0333415 | A1* | 11/2014 | Kursun | G06F 21/32 340/5.83 |
| 2015/0220715 | A1* | 8/2015 | Kim | G06F 21/32 726/18 |
| 2015/0257004 | A1* | 9/2015 | Shanmugam | H04W 12/06 455/411 |

FOREIGN PATENT DOCUMENTS

| | | |
|---|---|---|
| CN | 103607282 A | 2/2014 |
| CN | 103841108 A | 6/2014 |
| KR | 20120125802 A | 11/2012 |

\* cited by examiner

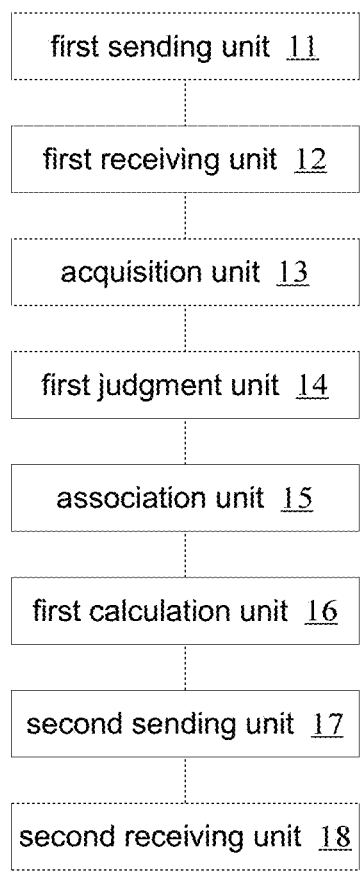
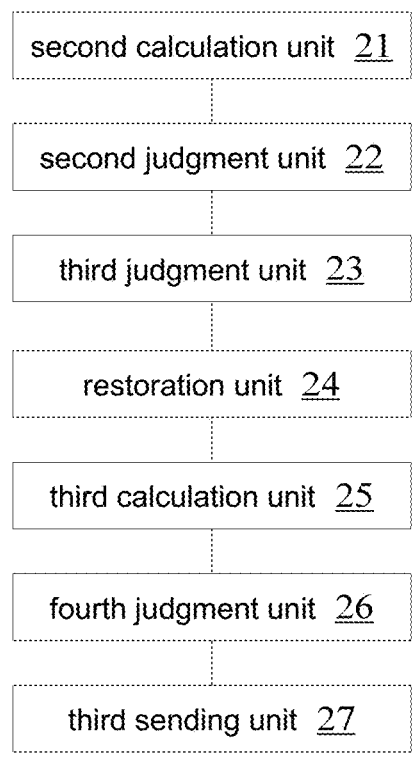
FIG. 4
FIG. 5

USER BIOLOGICAL FEATURE AUTHENTICATION METHOD AND SYSTEM

CROSS REFERENCE TO RELATED APPLICATIONS

This application is a national stage application under 35 U.S.C. § 371 of International Application No. PCT/CN2015/072448 filed 6 Feb. 2015 entitled "Method and system for authentication biological characteristics of user," which claims priority to Chinese Patent Application No. 201410090623.2 filed 12 Mar. 2014.

TECHNICAL FIELD

The disclosure relates to the field of biological recognition, and in particular to a user biological feature authentication method and system.

BACKGROUND

Up to now, Internet has been developed into a platform irreplaceable for people's work, life, social contact and operation. As an extension and evolution direction of conventional Internet, mobile Internet has been developed more rapidly in the past two years. Nowadays, more and more users are enabled to access the Internet for rich data services and Internet service contents through high-speed mobile networks and powerful intelligent terminals. Mobile Internet has become one of major manners for people throughout the world to access the Internet.

With arrival of the mobile Internet era, security problems of terminals and networks become more and more serious, users are frequently attacked by hackers, Trojans and malware, and loss or stealing of mobile phones, stealing of bank accounts, embezzlement of cash, illegal use of user Identities (IDs) and the like are common. Various potential network security hazards arouse worries of people about network security, and an ID authentication mode of "username+password" may not meet a network security requirement any longer. Biological features such as faces, voiceprints, fingerprints, irises and the like have the features of uniqueness, stability, unduplicatedness and the like, and these features may be utilized to implement secure and convenient ID recognition to overcome the shortcomings and defects of forgetting, stealing, leakage, cracking and the like of conventional authentication manners of signatures, passwords, magnetic cards, Integrated Circuit (IC) cards and the like. Along with continuous development and perfection, a biological feature recognition technology is widely applied to a network security system, draws attention of experts and the masses of users, and is preferred for terminal login, ID authentication and public security management.

Although a biological feature recognition technology is advanced and reliable, its security and reliability are based on security of biological feature data, and how to ensure reality and validity of biological feature data and avoid the biological feature data being stolen and leaked is a practical problem now. Leakage of biological feature data in a network transmission process may result in a catastrophic consequence. Cases of illegally acquiring and duplicating biological features of others and cheating a computer system for false authentication with the duplicated biological features also happen occasionally.

In order to ensure security of ID recognition with a biological feature, a voiceprint authentication system is proposed in a conventional art, and the authentication system mainly performs content analysis on a speech provided by a user, performs mode matching on an analyzed speech content and a password content, then performs speech validity detection on speech data provided by the user, and if the speech data is valid data naturally produced by the user, further analyzes speech features to judge whether the speech passes voiceprint authentication or not.

The abovementioned authentication manner improves security of ID recognition with a biological feature to a certain extent although, the authentication manner is undiversified, and a voiceprint is easily faked or counterfeited to cause false authentication, which greatly reduces security authentication effectiveness.

For the problem of undiversified biological feature recognition and authentication manner in a related technology, there is yet no effective solution.

SUMMARY

A main purpose of the disclosure is to provide a user biological feature authentication method and system, so as to solve the problem of undiversified biological feature recognition and authentication manner in the conventional art.

According to one aspect of the disclosure, a user biological feature authentication method is provided, which includes that: a client sends an authentication request to a server; the client receives a speech password from the server; the client acquires speech information of a user to be authenticated, and acquires a face image of the user to be authenticated in a speech information acquisition process; the client judges whether the speech information is the same as the speech password or not, and judges whether the face image is valid; the client associates a speech information fragment to the face image under the condition that the speech information is determined to be the same as the speech password and the face image is determined to be valid, wherein the speech information fragment is a part of speech information acquired within a first time, the first time includes a second time and the second time is acquisition time of the face image; the client calculates a digest value of the speech password, the speech information, a target image, associated information between the target image and the speech information fragment and a first moment to obtain a first digest value by adopting a preset algorithm, wherein the target image is a face image associated with the speech information fragment and the first moment is time when the server receives the authentication request; the client sends an authentication content to the server, wherein the authentication content includes the speech information, the target image, the associated information and the first digest value; and the client receives an authentication response from the server, wherein the authentication response is a processing result, obtained by the server, of the speech password and the authentication content.

Furthermore, the authentication response includes a first authentication response and a second authentication response, wherein, after the step that the client sends the authentication content to the server and before the step that the client receives the authentication response from the server, the authentication method further includes that: the server recalculates a digest value of the speech password, the speech information, the target image, the associated information and the first moment to obtain a second digest value by adopting the preset algorithm; the server judges whether the first digest value is the same as the second digest value or not; the server judges whether the speech information is the same as the speech password or not under the condition that the first digest value is determined to be the same as the second digest value; the server restores the target image to obtain the face image under the condition that the speech information is determined to be the same as the speech password; the server calculates a similarity between the speech information and a preset voiceprint model, and calculates a similarity between the face image and a preset face model; the server judges whether the voiceprint similarity reaches a first preset value or not, and judges whether the face similarity reaches a second preset value or not, wherein the voiceprint similarity is the calculated similarity between the speech information and the preset voiceprint model, and the face similarity is the calculated similarity between the face image and the preset face model; and the server sends the first authentication response and a judgment result to the client under the condition that the voiceprint similarity is determined to reach the first preset value and the face similarity is determined to reach the second preset value, or sends the second authentication response and the judgment result to the client under the condition that the voiceprint similarity is determined not to reach the first preset value and the face similarity is determined not to reach the second preset value, wherein the first authentication response represents that the user to be authenticated passes authentication, and the second authentication response represents that the user to be authenticated does not pass authentication.

Furthermore, the authentication method further includes that: the server judges whether the voiceprint similarity reaches a third preset value or not under the condition that the voiceprint similarity is determined not to reach the first preset value and the face similarity is determined to reach the second preset value, wherein the server sends the first authentication response and the judgment result to the client under the condition that the voiceprint similarity is determined to reach the third preset value, or sends the second authentication response and the judgment result to the client under the condition that the voiceprint similarity is determined not to reach the third preset value, wherein the third preset value is smaller than the first preset value; or the server judges whether the face similarity reaches a fourth preset value or not under the condition that the voiceprint similarity is determined to reach the first preset value and the face similarity is determined not to reach the second preset value, wherein the server sends the first authentication response and the judgment result to the client under the condition that the face similarity is determined to reach the fourth preset value, or sends the second authentication response and the judgment result to the client under the condition that the face similarity is determined not to reach the fourth preset value, wherein the fourth preset value is smaller than the second preset value.

Furthermore, the step that the server judges whether the speech information is the same as the speech password or not includes that: the server acquires character strings which represent the speech information and the speech password respectively; the server compares whether the character strings which represent the speech information and the speech password are the same or not; and the server determines that the speech information is the same as the speech password under the condition that the character strings which represent the speech information and the speech password are determined to be the same.

Furthermore, after the step that the client sends the authentication content to the server and before the client receives the authentication response from the server, the authentication method further includes that: the server calculates a time interval between a second moment and the first moment, wherein the second moment is time when the server receives the authentication content; the server judges whether the time interval is shorter than a preset time length or not; and the server processes the speech password and the authentication content under the condition that the time interval is determined to be shorter than the preset time length.

Furthermore, after the step that the client receives the speech password from the server, the authentication method further includes that: the client monitors a mouth area of the user to be authenticated, wherein the client acquires the speech information under the condition that the mouth area is monitored to change, and acquires the face image in the speech information acquisition process.

Furthermore, the face image includes at least two face images, and the step that the client judges whether the face image is valid includes that: the client calculates a similarity between the at least two face images; the client judges whether the similarity between the at least two face images reaches a fifth preset value or not; and the client determines that the face images are valid under the condition that the similarity between the at least two face images is determined to reach the fifth preset value.

Furthermore, a format of the speech password is a text format, a format of both the speech information and the speech information fragment is an audio format and a format of the face image is a picture format, wherein the step that the client judges whether the speech information is the same as the speech password or not includes that: the client acquires the character strings which represent the speech information and the speech password respectively, compares whether the character strings which represent the speech information and the speech password are the same or not, and determines that the speech information is the same as the speech password under the condition that the character strings which represent the speech information and the speech password are determined to be the same; and the step that the client associates the speech information fragment to the face image under the condition that the speech information is determined to be the same as the speech password and the face image is determined to be valid includes that: the client converts the speech information fragment into a speech text picture, and superimposes the speech text picture to the face image.

According to the other aspect of the disclosure, a user biological feature authentication system is provided, which includes a client and a server, wherein the client includes: a first sending unit, configured to send an authentication request to the server; a first receiving unit, configured to receive a speech password from the server; an acquisition unit, configured to acquire speech information of a user to be authenticated, and acquire a face image of the user to be authenticated in a speech information acquisition process; a first judgment unit, configured to judge whether the speech information is the same as the speech password or not, and judge whether the face image is valid; an association unit, configured to associate a speech information fragment to the face image under the condition that the speech information is determined to be the same as the speech password and the face image is determined to be valid, wherein the speech information fragment is a part of speech information acquired within a first time, the first time includes a second time and the second time is acquisition time of the face image; a first calculation unit, configured to calculate a digest value of the speech password, the speech information, a target image, associated information between the target image and the speech information fragment and a first moment to obtain a first digest value by adopting a preset algorithm, wherein the target image is a face image associated with the speech information fragment and the first moment is time when the server receives the authentication request; a second sending unit, configured to send an authentication content to the server, wherein the authentication content includes the speech information, the target image, the associated information and the first digest value; and a second receiving unit, configured to receive an authentication response from the server, wherein the authentication response is a processing result, obtained by the server, of the speech password and the authentication content.

Furthermore, the authentication response includes a first authentication response and a second authentication response, and the server includes: a second calculation unit, configured to recalculate a digest value of the speech password, the speech information, the target image, the associated information and the first moment to obtain a second digest value by adopting the preset algorithm; a second judgment unit, configured to judge whether the first digest value is the same as the second digest value or not; a third judgment unit, configured to judge whether the speech information is the same as the speech password or not under the condition that the first digest value is determined to be the same as the second digest value; a restoration unit, configured to restore the target image to obtain the face image under the condition that the speech information is determined to be the same as the speech password; a third calculation unit, configured to calculate a similarity between the speech information and a preset voiceprint model, and calculate a similarity between the face image and a preset face model; a fourth judgment unit, configured to judge whether the voiceprint similarity reaches a first preset value or not, and judge whether the face similarity reaches a second preset value or not, wherein the voiceprint similarity is the calculated similarity between the speech information and the preset voiceprint model, and the face similarity is the calculated similarity between the face image and the preset face model; and a third sending unit, configured to send the first authentication response and a judgment result to the client under the condition that the voiceprint similarity is determined to reach the first preset value and the face similarity is determined to reach the second preset value, or send the second authentication response and the judgment result to the client under the condition that the voiceprint similarity is determined not to reach the first preset value and the face similarity is determined not to reach the second preset value, wherein the first authentication response represents that the user to be authenticated passes authentication, and the second authentication response represents that the user to be authenticated does not pass authentication.

Furthermore, the fourth judgment unit is further configured to judge whether the voiceprint similarity reaches a third preset value or not under the condition that the fourth judgment unit determines that the voiceprint similarity does not reach the first preset value and the face similarity reaches the second preset value, wherein the third sending unit is further configured to send the first authentication response and the judgment result to the client under the condition that the fourth judgment unit determines that the voiceprint similarity reaches the third preset value, or the third sending unit is further configured to send the second authentication response and the judgment result to the client under the condition that the fourth judgment unit determines that the voiceprint similarity does not reach the third preset value, wherein the third preset value is smaller than the first preset value; or the fourth judgment unit is further configured to judge whether the face similarity reaches a fourth preset value or not under the condition that the fourth judgment unit determines that the voiceprint similarity reaches the first preset value and the face similarity does not reach the second preset value, wherein the third sending unit is further configured to send the first authentication response and the judgment result to the client under the condition that the fourth judgment unit determines that the face similarity reaches the fourth preset value, or the third sending unit is further configured to send the second authentication response and the judgment result to the client under the condition that the fourth judgment unit determines that the face similarity does not reach the fourth preset value, wherein the fourth preset value is smaller than the second preset value.

Furthermore, the third judgment unit includes: a first acquisition subunit, configured to acquire character strings which represent the speech information and the speech password respectively; a first comparison subunit, configured to compare whether the character strings which represent the speech information and the speech password are the same or not; and a first determination subunit, configured to determine that the speech information is the same as the speech password under the condition that the first comparison subunit determines that the character strings which represent the speech information and the speech password are the same.

Furthermore, the server further includes: a fourth calculation unit, configured to calculate a time interval between a second moment and the first moment, wherein the second moment is time when the server receives the authentication content; a fifth judgment unit, configured to judge whether the time interval is shorter than a preset time length or not; and a processing unit, configured to process the speech password and the authentication content under the condition that the fifth judgment unit determines that the time interval is shorter than the preset time length.

Furthermore, the client further includes: a monitoring unit, configured to monitor a mouth area of the user to be authenticated, wherein the acquisition unit acquires the speech information under the condition that the monitoring unit monitors that the mouth area changes, and acquires the face image in the speech information acquisition process.

Furthermore, the face image includes at least two face images, and the first judgment unit includes: a calculation subunit, configured to calculate a similarity between the at least two face images; a judgment subunit, configured to judge whether the similarity between the at least two face images reaches a fifth preset value or not; and a second determination subunit, configured to determine that the face images are valid under the condition that the judgment subunit determines that the similarity between the at least two face images reaches the fifth preset value.

Furthermore, a format of the speech password is a text format, a format of both the speech information and the speech information fragment is an audio format and a format of the face image is a picture format, wherein the first judgment unit further includes: a second acquisition subunit, a second comparison subunit and a third determination subunit, wherein the second acquisition subunit is configured to acquire the character strings which represent the speech information and the speech password respectively, the second comparison subunit is configured to compare whether the character strings which represent the speech information and the speech password are the same or not, and the third determination subunit is configured to determine that the speech information is the same as the speech password under the condition that the second comparison subunit compares that the character strings which represent the speech information and the speech password are the same; and the association unit includes: a conversion unit and a superimposition unit, wherein the conversion subunit is configured to convert the speech information fragment into a speech text picture, and the superimposition unit is configured to superimpose the speech text picture to the face image.

In the disclosure, the face image is simultaneously acquired in the speech information acquisition process under the condition that the speech password is received, and the speech information fragment before and after the face image is acquired is associated to the face image to implement association of the speech information, the face image and the speech password, so that high false authentication rate of an undiversified authentication manner caused by faking or counterfeiting in the conventional art is avoided, the problem of undiversified biological feature recognition and authentication manner in the conventional art is solved, and the effect of improving ID authentication security in a biological feature recognition process is further achieved. Furthermore, a dynamic speech with the characteristic of preventing recording and replaying is used as the speech password, and the face image and the speech information are associated, so that real-time performance and randomness are ensured, effective association between a speech and a face is implemented, and the effect of fully verifying activity of a biological feature is achieved.

BRIEF DESCRIPTION OF THE DRAWINGS

The drawings forming a part of the disclosure are adopted to provide further understanding of the disclosure, and schematic embodiments of the disclosure and description thereof are adopted to explain the disclosure and not intended to form improper limits to the disclosure. In the drawings:

FIG. 4 is a diagram of a client in a user biological feature authentication system according to an embodiment of the disclosure;

FIG. 5 is a diagram of a server in a user biological feature authentication system according to an embodiment of the disclosure.

DETAILED DESCRIPTION OF THE EMBODIMENTS

Figure 1:
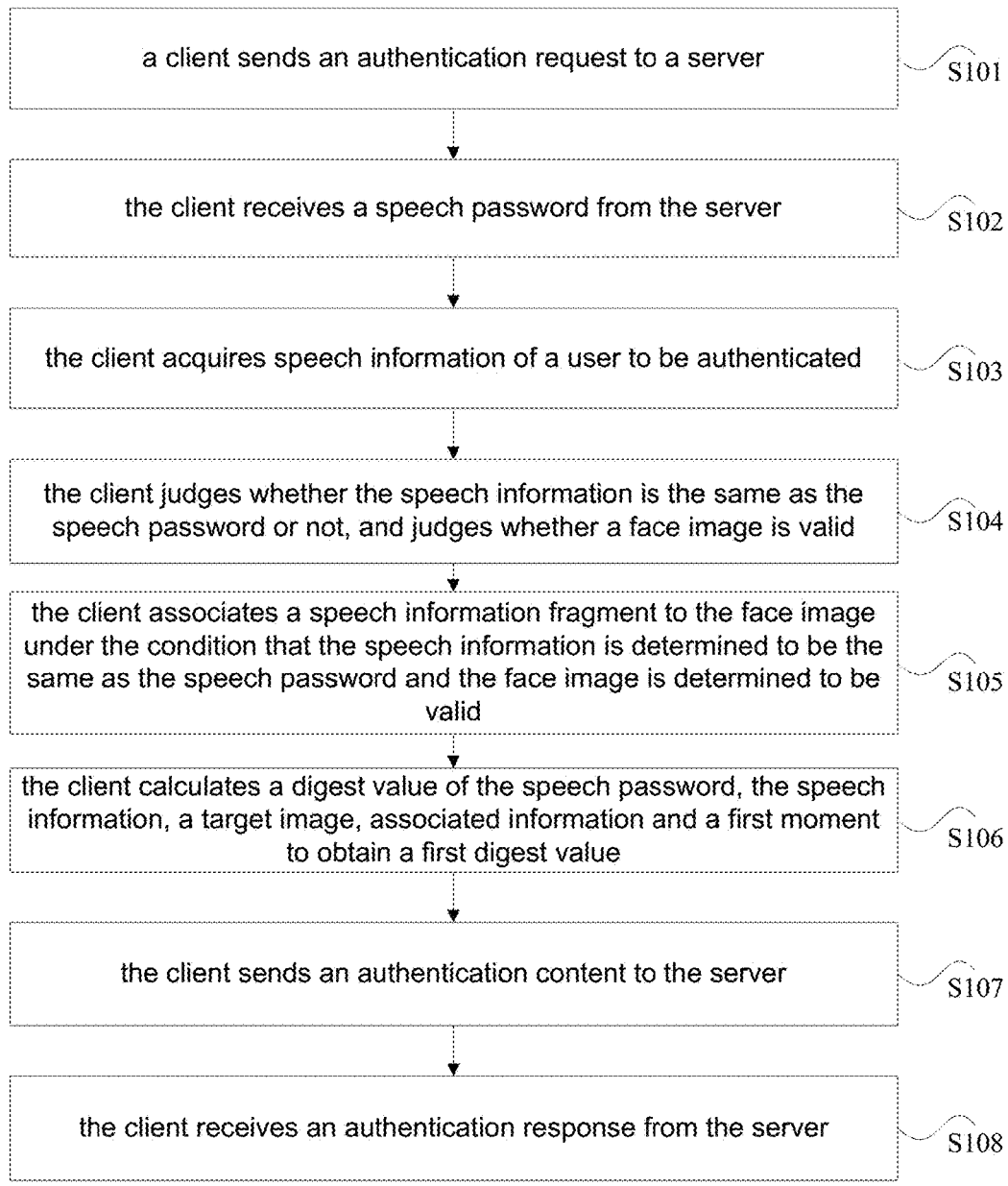
FIG. 1 is a flowchart of a user biological feature authentication method according to an embodiment of the disclosure.

In order to make those skilled in the art better understand the solutions of the disclosure, the technical solutions in the embodiments of the disclosure will be clearly and completely described below with reference to the drawings in the embodiments of the disclosure, and obviously, the described embodiments are not all embodiments but only a part of embodiments of the disclosure. All of other embodiments obtained on the basis of the embodiments of the disclosure by those skilled in the art without creative work shall fall within the scope of protection of the disclosure.

It is important to note that terms "first", "second" and the like in Specification, Claims and drawings of the disclosure are adopted to distinguish similar objects rather than describe specific sequences or orders. It should be understood that such data may be interchanged under an appropriate condition to make it possible to implement the embodiments, described here, of the disclosure in sequences except those shown or described here. In addition, terms "include" and "have" and any transformation thereof are intended to cover nonexclusive inclusions, and for example, a process, method, system, product or equipment including a series of steps or units may not be limited to the steps or units which are clearly listed, and instead, may include other steps or units which are not clearly listed or intrinsic for the process, method, product or equipment.

The embodiments in the disclosure and characteristics in the embodiments can be combined under the condition of no conflicts. The disclosure will be described with reference to the drawings and the embodiments in detail.

At first, technical terms involved in the embodiments of the disclosure are explained as follows.

(1) Speech Recognition

A speech recognition technology, also called Automatic Speech Recognition (ASR), aims to convert a lexical content in a human speech into computer-readable input.

(2) Voiceprint Recognition (VPR)

VPR, also called speaker recognition, includes two types, i.e. speaker identification and speaker verification.

A text-relevant application mode: text relevance refers to that a speech content of a user is required to be the same as that generated during voiceprint registration or a text broadcast in a prompting speech during VPR and namely serves as a verification code in form of voice password, which may effectively prevent a deceptive behavior of recording and replaying.

A text-irrelevant application mode: text irrelevance refers to a speech content of a user may be arbitrary during VPR and is not required to be relevant to a speech generated during registration, which may improve a user experience.

(3) Speech Password

A speech password is a visible character configured for speech text prompting or speech text verification, for example: a number, a Chinese character and a letter, and the speech password may be a one-time valid dynamic password, and may also be a fixed password.

(4) Speech Text Prompt

A speech text prompt is a speech text content displayed on a screen or a text content during voice broadcasting, and is configured to prompt a speech content of a speaker.

(5) Speech Text Picture

A speech text content is converted into a picture form, and meanwhile, a text picture may also be converted into a text form in an Optical Character Recognition (OCR) technology.

(6) Biological Feature Model

Extracting a feature sequence to obtain a biological feature model by virtue of acquired biological feature samples is called a modeling process, such as a voiceprint model and a face model.

(7) Validity

Validity of a biological feature refers to availability and reality (biological activity) of the biological feature, and whether the biological feature is real and valid is judged by validity checking.

(8) Digest

Dynamic factors such as biological feature information, a timestamp and a speech password are combined, and a one-way fixed-length character string, i.e. digest, is generated by adopting a hash algorithm, and minor modification of any factor may make the digest totally different.

Embodiment 1

According to the embodiment of the disclosure, a method embodiment which may be configured to implement a device embodiment of the disclosure may be provided. It is important to note that steps shown in the flowchart of the drawing may be executed in a computer system, such as a set of computers, capable of executing instructions, and moreover, although a logic sequence is shown in the flowchart, the shown or described steps may be executed in a sequence different from that described here under some circumstances.

According to the embodiment of the disclosure, a user biological feature authentication method is provided, and the user biological feature authentication method provided by the embodiment of the disclosure will be specifically introduced below.

FIG. 1 is a flowchart of a user biological feature authentication method according to an embodiment of the disclosure, and as shown in FIG. 1, the method includes the following Step 101 to Step 108.

Step 101: a client sends an authentication request to a server. Specifically, when a user to be authenticated is authenticated through the client, it is necessary to determine a comparison manner for biological feature authentication, that is, a "one-to-one" feature comparison manner and a "one-to-many" feature comparison manner are selected from the client, wherein the user to be authenticated is required to input identification information (for example: a user ID) of the user to be authenticated on the client under the "one-to-one" comparison manner; and under the condition that the user to be authenticated selects the "one-to-many" comparison manner, the user is not required to input the identification information, and the client directly sends the authentication request to the server, wherein the client may be distributed on a network terminal such as a mobile phone, a tablet and a notebook computer.

Step 102: the client receives a speech password from the server. Specifically, the server may feed back the speech password and a timestamp to the client after receiving the authentication request sent by the client, wherein the speech password may be a fixed password, may also be a one-time valid dynamic password, and is preferably a dynamic password in the embodiment of the disclosure; and the timestamp is time when the server receives the authentication request.

Step 103: the client acquires speech information of the user to be authenticated, and acquires a face image of the user to be authenticated in a speech information acquisition process. Specifically, the client prompts the user to be authenticated to provide a speech according to the speech password after receiving the speech password, enables a biological feature acquisition function to acquire the speech information, and simultaneously acquires the face image of the user to be authenticated in the speech information acquisition process, wherein the biological feature acquisition function includes functions of face shooting, face mouth posture detection, speech detection, speech acquisition and the like.

Step 104: the client judges whether the speech information is the same as the speech password or not, and judges whether the face image is valid.

Step 105: the client associates a speech information fragment to the face image under the condition that the speech information is determined to be the same as the speech password and the face image is determined to be valid, wherein the speech information fragment is a part of speech information acquired within a first time, the first time includes a second time, and the second time is acquisition time of the face image, that is, speech information fragments before and after acquisition of the face image are associated to the face image.

Step 106: the client calculates a digest value of the speech password, the speech information, a target image, associated information between the target image and the speech information fragment and a first moment to obtain a first digest value by adopting a preset algorithm, wherein the target image is a face image associated with the speech information fragment and the first moment is time when the server receives the authentication request. Specifically, hash operation may be performed on "speech password+speech information+target image+associated information+first moment" to obtain the first digest value, and a specific operation process is as follows.

There are multiple hash algorithms, including, but not limited to: algorithms of SHA-1, SHA-256, SM3, MD5 and the like. Here, H(BIO, TM, CN) is adopted for representation, wherein BIO represents biological feature information, including the speech information, the target image and the associated information between the target image and the speech information fragment, TM represents a timestamp, the timestamp specifically being the first moment in the calculation process of the first digest value, and CN represents the speech password.

CN is a random number, is at least an 8-bit visible character, is represented by the speech password here, for example: "59713131", and is represented as "0x35, 0x39, 0x37, 0x31, 0x33, 0x31, 0x33, 0x31" during operation.

TM is the timestamp, and if current time is fifteen one on Sep. 20, 2012, the corresponding TM is represented as 12-byte data "0x32, 0x30, 0x31, 0x32, 0x30, 0x39, 0x32, 0x30, 0x31, 0x35, 0x30, 0x31"

BIO is biological feature data, and is a variable-length field, and a biological feature includes the speech information, the target image and the related associated information here.

The field data forms a segment of variable-length data, i.e. BIO+TM+CN, as input original data, and fixed-length digest data is formed by operation of the hash algorithm, wherein:

SM3: a generated digest has 32 bytes;

SHA-1: a generated digest has 20 bytes;

SHA-256: a generated digest has 32 bytes; and

MD5: a generated digest has 16 bytes.

In the disclosure, the digest data is generated by operation of the random number, the timestamp, the biological feature information and the like, and each factor has a dynamic characteristic, so that it is the best manner for ensuring information integrity and reliability.

Step 107: the client sends an authentication content to the server, wherein the authentication content includes the speech information, the target image, the associated information between the target image and the speech information fragment and the first digest value.

Step 108: the client receives an authentication response from the server, wherein the authentication response is a processing result, obtained by the server, of the speech password and the authentication content. Specifically, the server processes the authentication content after receiving the authentication content, feeds back an authentication result and authentication response representative of successful authentication to the client if the client passes authentication, and on the contrary, feeds back an authentication result and authentication response representative of failed authentication to the client.

According to the user biological feature authentication method provided by the embodiment of the disclosure, the face image is simultaneously acquired in the speech information acquisition process under the condition that the speech password is received, and the speech information fragment before and after the face image is acquired is associated to the face image to implement association of the speech information, the face image and the speech password, so that high false authentication rate of an undiversified authentication manner caused by faking or counterfeiting in the conventional art is avoided, the problem of undiversified biological feature recognition and authentication manner in the conventional art is solved, and the effect of improving ID authentication security in a biological feature recognition process is further achieved. Furthermore, a dynamic speech with the characteristic of preventing recording and replaying is used as the speech password, and the face image and the speech information are associated, so that real-time performance and randomness are ensured, effective association between a speech and a face is implemented, and the effect of fully verifying activity of a biological feature is achieved.

Wherein, after the step that the client receives the speech password from the server and before the client acquires the speech information of the user to be authenticated, the authentication method of the embodiment of the disclosure further includes that: the client monitors a mouth area of the user to be authenticated, wherein the client acquires the speech information under the condition that the mouth area is monitored to change, and acquires the face image in the speech information acquisition process. Specifically, if a mouth in a monitoring picture is monitored to be opened or closed, the mouth area is determined to change.

Figure 2:
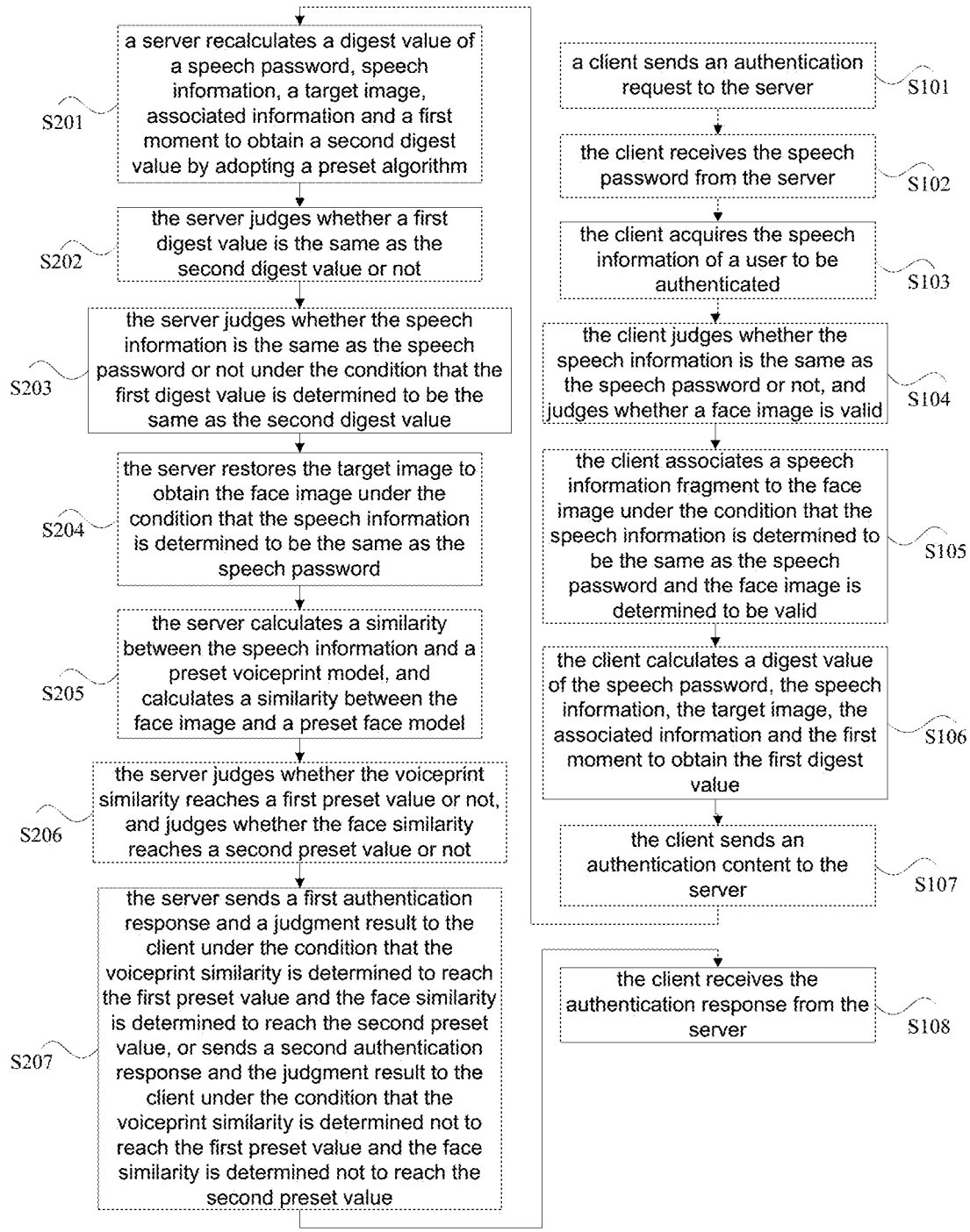
FIG. 2 is a flowchart of a user biological feature authentication method according to a preferred embodiment of the disclosure.

Preferably, the authentication response sent to the client by the server includes a first authentication response and a second authentication response, wherein the first authentication response represents that the user to be authenticated passes authentication, and the second authentication response represents that the user to be authenticated does not pass authentication. As shown in FIG. 2, after Step 107 that the client sends the authentication content to the server and Step 108 that the client receives the authentication response from the server, the authentication method of the embodiment of the disclosure further includes:

Step 201: the server recalculates a digest value of the speech password, the speech information, the target image, the associated information and the first moment to obtain a second digest value by adopting the preset algorithm. That is, the server performs digest value calculation again on the speech password, the first moment and the authentication content sent by the client by adopting the algorithm the same as that adopted by the client, and a specific calculation manner is the same as the abovementioned manner for calculating the first digest value by the client, and will not be elaborated herein.

Step 202: the server judges whether the first digest value is the same as the second digest value or not, wherein, it is indicated that data transmitted by the client is completely real and integral and is not tampered if it is determined that the first digest value is the same as the second digest value, and on the contrary, the data is illegal.

Step 203: the server judges whether the speech information is the same as the speech password or not under the condition that the first digest value is determined to be the same as the second digest value. That is, whether the speech information is the same as the speech password or not is further judged under the condition that the data transmitted by the client is determined to be completely real and integral, and under the condition that a judgment result is YES, it is indicated that the speech information data transmitted by the client is real and valid. Specifically, character strings which represent the speech information and the speech password respectively are mainly acquired, whether the character strings which represent the speech information and the speech password are the same or not is judged, and under the condition that the character strings which represent the speech information and the speech password are determined to be the same, the speech information is determined to be the same as the speech password.

Step 204: the server restores the target image to obtain the face image under the condition that the speech information is determined to be the same as the speech password, wherein restoring the target image is mainly to remove the speech information fragment from the target image, thereby fulfill the aim of restoring the face image. Since the face image is associated with a speaker, a speech text picture in a speaking process of the speaker is superimposed to the face image, the speech password is changing and face acquisition time is unfixed, the formed target image is real-time and random; and by association of the speech information fragment and the face image and a series of abovementioned judgment, it may be ensured that the acquired face image is real and valid and the shot face image and the acquired speech information belong to the same person.

Step 205: the server calculates a similarity between the speech information and a preset voiceprint model, and calculates a similarity between the face image and a preset face model. After a series of abovementioned judgment, it is determined that the speech information and the face image are real and valid and are not tampered, and the server performs VPR and face recognition to judge whether the user to be authenticated passes authentication or not.

Step 206: the server judges whether the voiceprint similarity reaches a first preset value or not, and judges whether the face similarity reaches a second preset value or not, wherein the voiceprint similarity is the calculated similarity between the speech information and the preset voiceprint model, and the face similarity is the calculated similarity between the face image and the preset face model.

Specifically, if the user to be authenticated selects the "one-to-one" comparison manner through the client in Step 101, the server finds the preset voiceprint model and the preset face model from a preset database according to the identification information of the user to be authenticated, wherein multiple sets of voiceprint models and face models are stored in the preset database, each set of voiceprint model and face model has identification information, and if the "one-to-one" comparison manner is determined in the previous step, the server is only required to find a set of voiceprint model and face model with the same identification information from the preset database, and performs calculation and judgment of the voiceprint similarity and the face similarity. If the "one-to-many" comparison manner is determined in the previous step, the server is required to sequentially calculate and judge similarities of the speech information and the face image and each set of preset voiceprint model and face model in a traversing manner.

Step 207: the server sends the first authentication response and a judgment result to the client under the condition that the voiceprint similarity is determined to reach the first preset value and the face similarity is determined to reach the second preset value, or sends the second authentication response and the judgment result to the client under the condition that the voiceprint similarity is determined not to reach the first preset value and the face similarity is determined not to reach the second preset value, wherein the first preset value and the second preset value are both set according to an algorithm evaluation index and a practical authentication accuracy requirement, and they may be the same, and may also be different.

A one-way digest is generated by adopting the hash algorithm, the operation process of the digest is irreversible, and minor modification of any factor may make the digest totally different. Therefore, performing digest value calculation on the speech password, the speech information, the target image, the associated information and the first moment through the client, performing digest value calculation again on the speech password, the speech information, the target image, the associated information and the first moment by adopting the same algorithm through the server and comparing whether the two are the same or not may ensure integrity, security and reliability of a biological feature recognition process. In addition, validity of the speech information and the face image is further checked under the condition that the digest values calculated by the client and the server are the same, so that biological feature validity checking is implemented, data tampering in system interaction and network communication processes is prevented, a combined authentication manner of multiple biological features is implemented, validity, reality and integrity of the data in the authentication process are ensured, and ID recognition security in a biological feature recognition process is further improved.

In addition, the authentication method further includes that: the server judges whether the voiceprint similarity reaches a third preset value or not under the condition that the voiceprint similarity is determined not to reach the first preset value and the face similarity is determined to reach the second preset value, wherein the server sends the first authentication response and the judgment result to the client under the condition that the voiceprint similarity is determined to reach the third preset value, or sends the second authentication response and the judgment result to the client under the condition that the voiceprint similarity is determined not to reach the third preset value, wherein the third preset value is smaller than the first preset value; or the server judges whether the face similarity reaches a fourth preset value or not under the condition that the voiceprint similarity is determined to reach the first preset value and the face similarity is determined not to reach the second preset value, wherein the server sends the first authentication response and the judgment result to the client under the condition that the face similarity is determined to reach the fourth preset value, or sends the second authentication response and the judgment result to the client under the condition that the face similarity is determined not to reach the fourth preset value, wherein the fourth preset value is smaller than the second preset value. The third preset value and the fourth preset value are both set according to the algorithm evaluation index and the practical authentication accuracy requirement.

That is, under the condition that one of the voiceprint similarity and the face similarity may reach an upper limit while the other may not reach an upper limit in Step 206, whether the similarity which may not reach the upper limit is lower than a corresponding lower limit or not is further judged, and if the similarity is determined not to be lower than the corresponding lower limit, it is still determined that the user passes authentication.

Preferably, after the step that the client sends the authentication content to the server and before the client receives the authentication response from the server, the authentication method of the embodiment of the disclosure further includes that: the server calculates a time interval between a second moment and the first moment, wherein the second moment is time when the server receives the authentication content; the server judges whether the time interval is shorter than a preset time length or not; and the server processes the speech password and the authentication content under the condition that the time interval is determined to be shorter than the preset time length, wherein the preset time length is a time length set according to a practical requirement.

If the time interval from authentication request initiation of the client to authentication content sending is longer, the possibility that the data transmitted to the server is counterfeited and tampered is higher, and by processing the speech password and the authentication content under the condition that the time interval is determined to be shorter than the preset time length, the possibility that the data is counterfeited and tampered is reduced, and authentication security is further improved.

Furthermore, in the embodiment of the disclosure, a format of the speech password is a text format, a format of both the speech information and the speech information fragment is an audio format, and a format of the face image is a picture format, wherein:

the step that the client judges whether the speech information is the same as the speech password or not includes that: the client acquires the character strings which represent the speech information and the speech password respectively, compares whether the character strings which represent the speech information and the speech password are the same or not, and determines that the speech information is the same as the speech password under the condition that the character strings which represent the speech information and the speech password are determined to be the same; and the step that the client associates the speech information fragment to the face image under the condition that the speech information is determined to be the same as the speech password and the face image is determined to be valid includes that: the client converts the speech information fragment into a speech text picture, and superimposes the speech text picture to the face image. Specifically, an exclusive OR manner may be adopted for picture superimposition, and a picture superimposition method and specific steps are as follows.

The speech information fragments before and after the shooting time of the face image are processed to generate single pictures in sequence, that is, speech text pictures are formed, a specification of each picture being the same, wherein a manner for converting the speech information fragments into the pictures may adopt any audio-to-picture manner in the conventional art, and will not be elaborated herein.

The speech text pictures are superimposed to the face image by adopting the exclusive OR method, i.e. "speech text picture ⊗ face image", "⊗" representing exclusive OR operation; and at the same time, a superimposition position of each speech text picture in the face image is recorded, each speech text picture being not overlapped in a superimposing process.

Associating the speech information with the face image in the picture superimposing manner is equivalent to addition of noise to the face image, which damages the face image and also protects the face image, and current speech text pictures of the speaker are superimposed, and are real-time.

Correspondingly, when the server restores the face image, the exclusive OR method is also adopted, and a specific reduction process and method are as follows: exclusive OR operation is performed on the target image to which the speech text pictures have been superimposed and the corresponding speech text pictures according to the superimposition position of each speech text picture in the face image, equivalent to removal of the speech text pictures at the corresponding positions from the face image, thereby fulfilling the aim of restoring the face image.

Furthermore, the acquired face image includes at least two face images, and a specific manner for the client to judge whether the face image is valid in Step 104 is as follows: the client calculates a similarity between the at least two face images; the client judges whether the similarity between the at least two face images reaches a fifth preset value or not; and the client determines that the face images are valid under the condition that the similarity between the at least two face images is determined to reach the fifth preset value. Judging availability and reality of speech data, face data and the like by virtue of the biological feature validity judgment method implements judgment and control of validity of the data from the source.

It is important to note that each abovementioned method embodiment is described as a combination of a series of operations for simple description, but those skilled in the art should know that the disclosure is not limited to the described operation sequence because some steps may be executed in other sequences or at the same time according to the disclosure. Second, those skilled in the art should also know that the embodiments described in the disclosure are all preferred embodiments, and involved operations and modules are not essential for the disclosure.

From the above description about implementation manners, those skilled in the art should clearly know that the method according to the embodiment may be implemented in a manner of software and necessary universal hardware platform, and of course, may also be implemented through hardware, but the former is a preferred implementation manner under many circumstances. Based on such understanding, the technical solutions of the disclosure essentially or parts making contributions to the conventional art may be embodied in form of software product, and the computer software product is stored in a storage medium (such as a Read-Only Memory/Random Access Memory (ROM/RAM), a magnetic disk and a compact disc), and includes a plurality of instructions configured to enable a piece of terminal equipment (which may be a mobile phone, a computer, a server, network equipment or the like) to execute the method in each embodiment of the disclosure.

Embodiment 2

According to the embodiment of the disclosure, a user biological feature authentication system for implementing the user biological feature authentication method is further provided, the authentication system is mainly configured to execute the authentication method provided by the abovementioned contents of the embodiment of the disclosure, and the user biological feature authentication system provided by the embodiment of the disclosure will be specifically introduced below.

Figure 3:
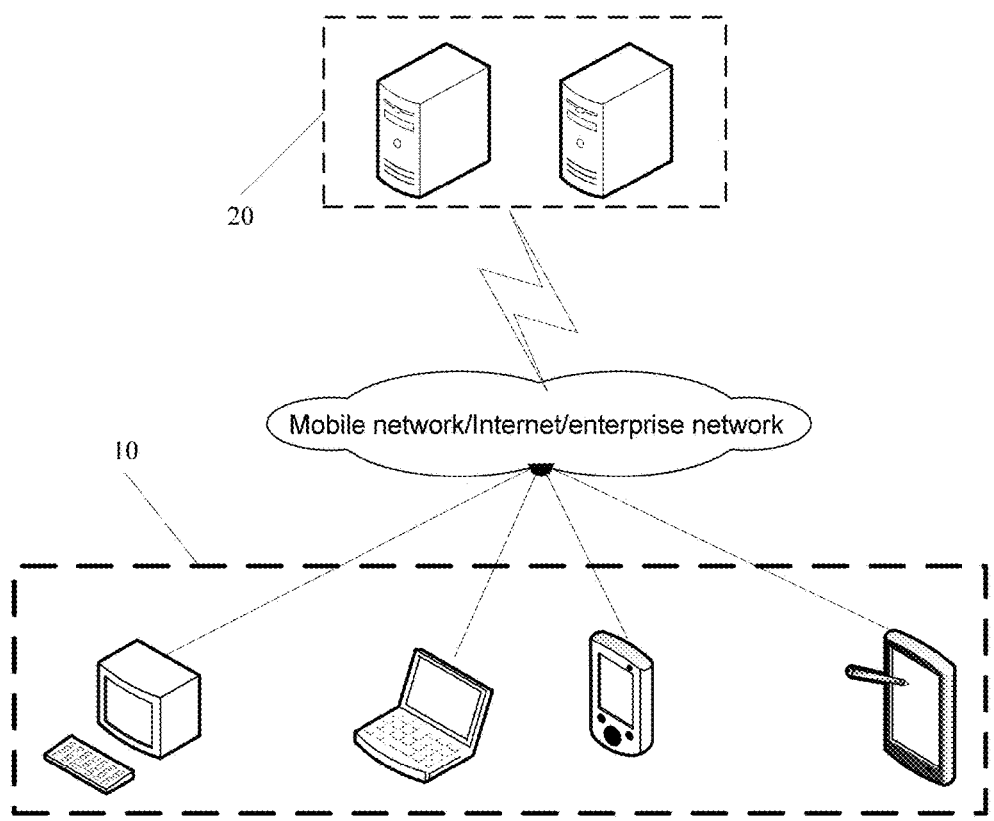
FIG. 3 is a diagram of a user biological feature authentication system according to an embodiment of the disclosure.

FIG. 3 is a diagram of an authentication system according to an embodiment of the disclosure, and as shown in FIG. 3, the authentication system mainly includes a client 10 and a server 20, wherein the client 10 and the server 20 may communicate through a mobile network, the Internet or an enterprise network. Specifically, as shown in FIG. 4, the client 10 mainly includes a first sending unit 11, a first receiving unit 12, an acquisition unit 13, a first judgment unit 14, an association unit 15, a first calculation unit 16, a second sending unit 17 and a second receiving unit 18, wherein the first sending unit 11 is configured to send an authentication request to the server 20. Specifically, when a user to be authenticated is authenticated through the client 10, it is necessary to determine a comparison manner for biological feature authentication, that is, a "one-to-one" feature comparison manner and a "one-to-many" feature comparison manner are selected from the client 10, wherein the user to be authenticated is required to input identification information (for example: a user ID) of the user to be authenticated on the client 10 under the "one-to-one" comparison manner; and under the condition that the user to be authenticated selects the "one-to-many" comparison manner, the user is not required to input the identification information, and the first sending unit 11 directly sends the authentication request to the server 20.

The first receiving unit 12 is configured to receive a speech password from the server 20. Specifically, the server 20 may feed back the speech password and a timestamp to the client 10 after receiving the authentication request sent by the client 10, wherein the speech password may be a fixed password, may also be a one-time valid dynamic password, and is preferably a dynamic password in the embodiment of the disclosure; and the timestamp is time when the server 20 receives the authentication request.

The acquisition unit 13 is configured to acquire speech information of the user to be authenticated, and acquire a face image of the user to be authenticated in a speech information acquisition process. Specifically, the client 10 prompts the user to be authenticated to provide a speech according to the speech password after the first receiving unit 12 receives the speech password, enables a biological feature acquisition function to acquire the speech information, and simultaneously acquires the face image of the user to be authenticated in the speech information acquisition process, wherein the biological feature acquisition function includes functions of face shooting, face mouth posture detection, speech detection, speech acquisition and the like. The acquisition unit 13 is a speech and shooting device arranged in the client 10, may be a device integrated in the client 10, and may also be an independent device which is connected with the client 10 for communication, and the speech device is configured for speaker speech acquisition and speech broadcasting, and the shooting device is configured to shoot the face image.

The first judgment unit 14 is configured to judge whether the speech information is the same as the speech password or not, and judge whether the face image is valid.

The association unit 15 is configured to associate a speech information fragment to the face image under the condition that the speech information is determined to be the same as the speech password and the face image is determined to be valid, wherein the speech information fragment is a part of speech information acquired within a first time, the first time includes a second time, and the second time is acquisition time of the face image, that is, speech information fragments before and after acquisition of the face image are associated to the face image.

The first calculation unit 16 is configured to calculate a digest value of the speech password, the speech information, a target image, associated information between the target image and the speech information fragment and a first moment to obtain a first digest value by adopting a preset algorithm, wherein the target image is a face image associated with the speech information fragment and the first moment is time when the server receives the authentication request. Specifically, hash operation may be performed on "speech password+speech information+target image+associated information+first moment" to obtain the first digest value, and a specific operation process is as follows.

There are multiple hash algorithms, including, but not limited to: algorithms of SHA-1, SHA-256, SM3, MD5 and the like. Here, H(BIO, TM, CN) is adopted for representation, wherein BIO represents biological feature information, including the speech information, the target image and the associated information between the target image and the speech information fragment, TM represents a timestamp, the timestamp specifically being the first moment in the calculation process of the first digest value, and CN represents the speech password.

CN is a random number, is at least an 8-bit visible character, is represented by the speech password here, for example: "59713131", and is represented as "0x35, 0x39, 0x37, 0x31, 0x33, 0x31, 0x33, 0x31" during operation.

TM is the timestamp, and if current time is fifteen one on Sep. 20, 2012, the corresponding TM is represented as 12-byte data "0x32, 0x30, 0x31, 0x32, 0x30, 0x39, 0x32, 0x30, 0x31, 0x35, 0x30, 0x31".

BIO is biological feature data, and is a variable-length field, and a biological feature includes the speech information, the target image and the related associated information here.

The field data forms a segment of variable-length data, i.e. BIO+TM+CN, as input original data, and fixed-length digest data is formed by operation of the hash algorithm, wherein SM3: a generated digest has 32 bytes;

SHA-1: a generated digest has 20 bytes;

SHA-256: a generated digest has 32 bytes; and

MD5: a generated digest has 16 bytes.

In the disclosure, the digest data is generated by operation of the random number, the timestamp, the biological feature information and the like, and each factor has a dynamic characteristic, so that it is the best manner for ensuring information integrity and reliability.

The second sending unit 17 is configured to send an authentication content to the server 20, wherein the authentication content includes the speech information, the target image, the associated information between the target image and the speech information fragment and the first digest value.

The second receiving unit 18 is configured to receive an authentication response from the server 20, wherein the authentication response is a processing result, obtained by the server 20, of the speech password and the authentication content. Specifically, the server 20 processes the authentication content after receiving the authentication content, feeds back an authentication result and authentication response representative of successful authentication to the client 10 if the client passes authentication, and on the contrary, feeds back an authentication result and authentication response representative of failed authentication to the client 10.

According to the user biological feature authentication system provided by the embodiment of the disclosure, the face image is simultaneously acquired in the speech information acquisition process under the condition that the speech password is received, and the speech information fragment before and after the face image is acquired is associated to the face image to implement association of the speech information, the face image and the speech password, so that high false authentication rate of an undiversified authentication manner caused by faking or counterfeiting in the conventional art is avoided, the problem of undiversified biological feature recognition and authentication manner in the conventional art is solved, and the effect of improving ID authentication security in a biological feature recognition process is further achieved. Furthermore, a dynamic speech with the characteristic of preventing recording and replaying is used as the speech password, and the face image and the speech information are associated, so that real-time performance and randomness are ensured, effective association between a speech and a face is implemented, and the effect of fully verifying activity of a biological feature is achieved.

Wherein, the client 10 further includes a monitoring unit, and after the first receiving unit 12 receives the speech password from the server 20, the monitoring unit monitors a mouth area of the user to be authenticated, wherein the acquisition unit 13 acquires the speech information under the condition that the mouth area is monitored to change, and acquires the face image in the speech information acquisition process. Specifically, if a mouth in a monitoring picture is monitored to be opened or closed, the mouth area is determined to change.

Preferably, the authentication response sent to the client 10 by the server 20 includes a first authentication response and a second authentication response, wherein the first authentication response represents that the user to be authenticated passes authentication, and the second authentication response represents that the user to be authenticated does not pass authentication. As shown in FIG. 5, the server 20 mainly includes: a second calculation unit 21, a second judgment unit 22, a third judgment unit 23, a restoration unit 24, a third calculation unit 25, a fourth judgment unit 26 and a third sending unit 27, wherein:

the second calculation unit 21 is configured to recalculate a digest value of the speech password, the speech information, the target image, the associated information and the first moment to obtain a second digest value by adopting the preset algorithm. That is, digest value calculation is performed again on the speech password, the first moment and the authentication content sent by the client 10 by adopting the algorithm the same as that adopted by the first calculation unit 16 of the client 10, and a specific calculation manner is the same as the abovementioned manner for calculating the first digest value by the client 10, and will not be elaborated herein. Wherein, the server 20 has an authentication request ID corresponding to the authentication request sent by the first sending unit 11, and may find the corresponding speech password and first moment according to the ID when receiving an authentication content from the same ID again.

The second judgment unit 22 is configured to judge whether the first digest value is the same as the second digest value or not, wherein, it is indicated that data transmitted by the client 10 is completely real and integral and is not tampered if it is determined that the first digest value is the same as the second digest value, and on the contrary, the data is illegal.

The third judgment unit 23 is configured to judge whether the speech information is the same as the speech password or not under the condition that the first digest value is determined to be the same as the second digest value. That is, whether the speech information is the same as the speech password or not is further judged under the condition that the data transmitted by the client 10 is determined to be completely real and integral, and under the condition that a judgment result is YES, it is indicated that the speech information data transmitted by the client 10 is real and valid. Specifically, the third judgment unit 23 mainly includes a first acquisition subunit, a first comparison subunit and a first determination subunit, wherein the first acquisition subunit is configured to acquire character strings which represent the speech information and the speech password respectively, the first comparison subunit is configured to compare whether the character strings which represent the speech information and the speech password are the same or not, and the first determination subunit is configured to, under the condition that the first comparison subunit determines that the character strings which represent the speech information and the speech password are determined to be the same, determine that the speech information is the same as the speech password.

The restoration unit 24 is configured to restore the target image to obtain the face image under the condition that the speech information is determined by the third judgment unit 23 to be the same as the speech password, wherein restoring the target image is mainly to remove the speech information fragment from the target image, thereby fulfill the aim of restoring the face image. Since the face image is associated with a speaker, a speech text picture in a speaking process of the speaker is superimposed to the face image, the speech password is changing and face acquisition time is unfixed, the formed target image is real-time and random; and by association of the speech information fragment and the face image and a series of abovementioned judgment, it may be ensured that the acquired face image is real and valid and the shot face image and the acquired speech information belong to the same person.

The third calculation unit 25 is configured to calculate a similarity between the speech information and a preset voiceprint model, and calculate a similarity between the face image and a preset face model. After a series of abovementioned judgment, it is determined that the speech information and the face image are real and valid and are not tampered, and the server 20 performs VPR and face recognition to judge whether the user to be authenticated passes authentication or not.

The fourth judgment unit 26 is configured to judge whether the voiceprint similarity reaches a first preset value or not, and judge whether the face similarity reaches a second preset value or not, wherein the voiceprint similarity is the calculated similarity between the speech information and the preset voiceprint model, and the face similarity is the calculated similarity between the face image and the preset face model.

Specifically, if the user to be authenticated selects the "one-to-one" comparison manner through the client 10, the server 20 finds the preset voiceprint model and the preset face model from a preset database according to the identification information of the user to be authenticated, wherein multiple sets of voiceprint models and face models are stored in the preset database, each set of voiceprint model and face model has identification information, and if the "one-to-one" comparison manner is determined in the previous step, the server 20 is only required to find a set of voiceprint model and face model with the same identification information from the preset database, and performs calculation and judgment of the voiceprint similarity and the face similarity. If the "one-to-many" comparison manner is determined in the previous step, the server 20 is required to sequentially calculate and judge similarities of the speech information and the face image and each set of preset voiceprint model and face model in a traversing manner.

The third sending unit 27 is configured to send the first authentication response and a judgment result to the client 10 under the condition that the fourth judgment unit 26 determines that the voiceprint similarity reaches the first preset value and the face similarity reaches the second preset value, or send the second authentication response and the judgment result to the client 10 under the condition that the fourth judgment unit 26 determines that the voiceprint similarity does not reach the first preset value and the face similarity does not reach the second preset value, wherein the first preset value and the second preset value are both set according to an algorithm evaluation index and a practical authentication accuracy requirement, and they may be the same, and may also be different.

A one-way digest is generated by adopting the hash algorithm, the operation process of the digest is irreversible, and minor modification of any factor may make the digest totally different. Therefore, performing digest value calculation on the speech password, the speech information, the target image, the associated information and the first moment through the client 10, performing digest value calculation again on the speech password, the speech information, the target image, the associated information and the first moment by adopting the same algorithm through the server 20 and comparing whether the two are the same or not may ensure integrity, security and reliability of a biological feature recognition process. In addition, validity of the speech information and the face image is further checked under the condition that the digest values calculated by the client 10 and the server 20 are the same, so that biological feature validity checking is implemented, data tampering in system interaction and network communication processes is prevented, a combined authentication manner of multiple biological features is implemented, validity, reality and integrity of the data in the authentication process are ensured, and ID recognition security in a biological feature recognition process is further improved.

In addition, the fourth judgment unit 26 is further configured to judge whether the voiceprint similarity reaches a third preset value or not under the condition that the fourth judgment unit 26 determines that the voiceprint similarity does not reach the first preset value and the face similarity reaches the second preset value, wherein the third sending unit is further configured to send the first authentication response and the judgment result to the client 10 under the condition that the fourth judgment unit 26 determines that the voiceprint similarity reaches the third preset value, or the third sending unit is further configured to send the second authentication response and the judgment result to the client 10 under the condition that the fourth judgment unit 26 determines that the voiceprint similarity does not reach the third preset value, wherein the third preset value is smaller than the first preset value; or the fourth judgment unit 26 is further configured to judge whether the face similarity reaches a fourth preset value or not under the condition that the fourth judgment unit 26 determines that the voiceprint similarity reaches the first preset value and the face similarity does not reach the second preset value, wherein the third sending unit is further configured to send the first authentication response and the judgment result to the client 10 under the condition that the fourth judgment unit 26 determines that the face similarity reaches the fourth preset value, or the third sending unit is further configured to send the second authentication response and the judgment result to the client 10 under the condition that the fourth judgment unit 26 determines that the face similarity does not reach the fourth preset value, wherein the fourth preset value is smaller than the second preset value. The third preset value and the fourth preset value are both set according to the algorithm evaluation index and the practical authentication accuracy requirement.

That is, under the condition that one of the voiceprint similarity and the face similarity may reach an upper limit while the other may not reach an upper limit in Step 206, whether the similarity which may not reach the upper limit is lower than a corresponding lower limit or not is further judged, and if the similarity is determined not to be lower than the corresponding lower limit, it is still determined that the user passes authentication.

Preferably, the server 20 further includes a fourth calculation unit, a fifth judgment unit and a processing unit, and after the first sending unit 11 sends the authentication content to the server 20 and before the first receiving unit 12 receives the authentication response from the server 20, the fourth calculation unit is configured to calculate a time interval between a second moment and the first moment, wherein the second moment is time when the server 20 receives the authentication content; the fifth judgment unit is configured to judge whether the time interval is shorter than a preset time length or not; and the processing unit is configured to process the speech password and the authentication content under the condition that the fifth judgment unit determines that the time interval is shorter than the preset time length, wherein the preset time length is a time length set according to a practical requirement.

If the time interval from authentication request initiation of the client 10 to authentication content sending is longer, the possibility that the data transmitted to the server 20 is counterfeited and tampered is higher, and by processing the speech password and the authentication content under the condition that the time interval is determined to be shorter than the preset time length, the possibility that the data is counterfeited and tampered is reduced, and authentication security is further improved.

Furthermore, the acquired face image includes at least two face images, and the first judgment unit 14 mainly includes a calculation subunit, a judgment subunit and a second determination subunit, wherein the calculation subunit is configured to calculate a similarity between the at least two face images; the judgment subunit is configured to judge whether the similarity between the at least two face images reaches a fifth preset value or not; and the second determination subunit is configured to determine that the face images are valid under the condition that the judgment subunit determines that the similarity between the at least two face images reaches the fifth preset value. Judging availability and reality of speech data, face data and the like by virtue of the biological feature validity judgment method implements judgment and control of validity of the data from the source.

Furthermore, in the embodiment of the disclosure, a format of the speech password is a text format, a format of both the speech information and the speech information fragment is an audio format, and a format of the face image is a picture format, wherein the first judgment unit further includes: a second acquisition subunit, a second comparison subunit and a third determination subunit, the second acquisition subunit is configured to acquire the character strings which represent the speech information and the speech password respectively, the second comparison subunit is configured to compare whether the character strings which represent the speech information and the speech password are the same or not, and the third determination subunit is configured to determine that the speech information is the same as the speech password under the condition that the second comparison subunit determines that the character strings which represent the speech information and the speech password are the same; and the association unit includes: a conversion subunit and a superimposition subunit, wherein the conversion subunit is configured to convert the speech information fragment into a speech text picture, and the superimposition subunit is configured to superimpose the speech text picture to the face image.

Specifically, an exclusive OR manner may be adopted for picture superimposition, and a picture superimposition method and specific steps are as follows: the speech information fragments before and after the shooting time of the face image are processed to generate single pictures in sequence, that is, speech text pictures are formed, a specification of each picture being the same, wherein a manner for converting the speech information fragments into the pictures may adopt any audio-to-picture manner in the conventional art, and will not be elaborated herein; the speech text pictures are superimposed to the face image by adopting the exclusive OR method, i.e. "speech text picture $\otimes$ face image", "$\otimes$" representing exclusive OR operation; and at the same time, a superimposition position of each speech text picture in the face image is recorded, each speech text picture being not overlapped in a superimposing process.

Associating the speech information with the face image in the picture superimposing manner is equivalent to addition of noise to the face image, which damages the face image and also protects the face image, and current speech text pictures of the speaker are superimposed, and are real-time.

Correspondingly, when the server 20 restores the face image, the exclusive OR method is also adopted, and a specific reduction process and method are as follows: exclusive OR operation is performed on the target image to which the speech text pictures have been superimposed and the corresponding speech text pictures according to the superimposition position of each speech text picture in the face image, equivalent to removal of the speech text pictures at the corresponding positions from the face image, thereby fulfilling the aim of restoring the face image.

From the above, it can be seen that the disclosure implements biological feature validity checking by association of the speech information, the face image and the speech password, prevents data tampering in system interaction and network communication processes, implements an authentication manner of multiple biological features and also ensures validity, reality and integrity of the data during biological feature recognition.

Figure 6:
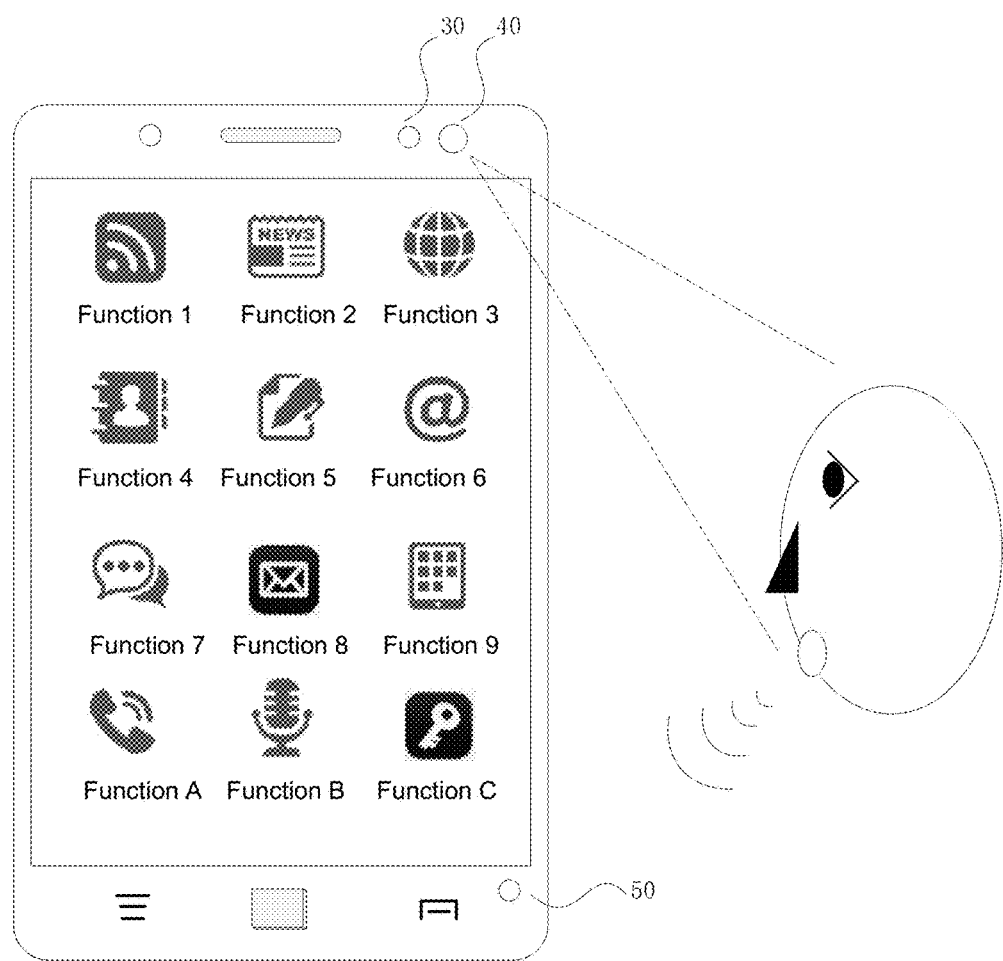
FIG. 6 is an application diagram of a user biological feature authentication system according to an embodiment of the disclosure.

A working principle of the user biological feature authentication method and system provided by the embodiment of the disclosure is further described with an example, and as shown in FIG. 6, specific description is made with distribution of a client 10 and a server 20 on a mobile phone as an example, wherein 40 is a camera, 30 is a light compensating lamp, face image acquisition may be implemented through 40 and 30, 50 is a microphone, speech acquisition may be implemented through 50, and in the embodiment, local login and function operation control of the mobile phone or a Pad are implemented by speech, voiceprint and face recognition technologies, and a specific implementation flow for user biological feature authentication is as follows:

Step 7-1: a user sends a speech instruction under a voice control mode, and a system extracts a speech and performs speech recognition to obtain an instruction keyword;

Step 7-2: if a function corresponding to the instruction does not require ID authentication, the system directly runs the function corresponding to the instruction; if the function corresponding to the instruction requires further ID authentication, the system generates a speech password N configured for subsequent speech recognition and voiceprint authentication;

Step 7-3: the user produces sounds according to the speech password, and the system starts acquires a speech, and records starting time (TM1) and ending time (TM2) in a speech acquisition process;

Step 7-4: a face image is shot in the speech acquisition process, a timestamp is acquired at the same time, the timestamp is processed to generate a picture, and the picture is superimposed into the face image, wherein a superimposing method may adopt an "exclusive OR" method, and the face image may be configured for subsequent face recognition, and may also be configured to store a historical record;

Step 7-5: speech recognition is performed to obtain speech information VN, consistency of the speech information VN and the speech password CN is judged, voiceprint authentication of the next step is continued if they are consistent, otherwise a prompt about a speech recognition failure is given;

Step 7-6: during voiceprint authentication, a speech feature is compared with a reserved voiceprint model in equipment to obtain a comparison result;

Step 7-7: during face authentication, the timestamp in the face image is removed to restore the face image, whether TM is between TM1 and TM2 or not is judged, and if YES, a face feature is compared with a reserved face model in the equipment to obtain a comparison result;

Step 7-8: the voiceprint comparison result and the face comparison result are judged, wherein it is determined that the user passes ID authentication if one of the voiceprint comparison result and the face comparison result meets a threshold requirement, further comparison judgment is performed if one of the two comparison results does not meet a requirement, and a specific comparison judgment manner is the same as the voiceprint comparison and face comparison judgment manner, and will not be elaborated herein; and Step 7-9: if the user passes ID authentication, the system executes the function corresponding to the instruction.

Obviously, those skilled in the art should know that each module or step of the present disclosure may be implemented by a universal computing device, and the modules or steps may be concentrated on a single computing device or distributed on a network formed by a plurality of computing devices, and may optionally be implemented by programmable codes executable for the computing devices, so that the modules or steps may be stored in a storage device for execution with the computing devices, or may form each integrated circuit module respectively, or multiple modules or steps therein can form a single integrated circuit module for implementation. As a consequence, the present disclosure is not limited to any specific hardware and software combination.

The above is only the preferred embodiment of the present disclosure and not intended to limit the present disclosure, and for those skilled in the art, the present disclosure may have various modifications and variations. Any modifications, equivalent replacements, improvements and the like within the spirit and principle of the present disclosure shall fall within the scope of protection of the present disclosure.

What is claimed is:

1. A user biological feature authentication method, comprising:
    sending, by a client, an authentication request to a server;
    receiving, by the client, a speech password from the server;
    acquiring, by the client, speech information of a user to be authenticated, and acquiring a face image of the user to be authenticated in a speech information acquisition process;
    judging, by the client, whether the speech information is the same as the speech password or not, and judges whether the face image is valid;
    associating, by the client, a speech information fragment to the face image under the condition that the speech information is determined to be the same as the speech password and the face image is determined to be valid, wherein the speech information fragment is a part of the speech information acquired within a first time, the first time comprises a second time and the second time is acquisition time of the face image;
    calculating, by the client, a digest value of the speech password, the speech information, a target image, associated information between the target image and the speech information fragment and a first moment to obtain a first digest value by adopting a preset algorithm, wherein the target image is a face image associated with the speech information fragment and the first moment is time when the server receives the authentication request;
    sending, by the client, an authentication content to the server, wherein the authentication content comprises the speech information, the target image, the associated information and the first digest value; and
    receiving, by the client, an authentication response from the server, wherein the authentication response is a processing result, obtained by the server, of the speech password and the authentication content.

2. The authentication method according to claim 1, wherein the authentication response comprises a first authentication response and a second authentication response, wherein, after the step that sending, by the client, the authentication content to the server and before the step that receiving, by the client, the authentication response from the server, the authentication method further comprises:
    recalculating, by the server, a digest value of the speech password, the speech information, the target image, the associated information and the first moment to obtain a second digest value by adopting the preset algorithm;
    judging, by the server, whether the first digest value is the same as the second digest value or not;
    judging, by the server, whether the speech information is the same as the speech password or not under the condition that the first digest value is determined to be the same as the second digest value;

restoring, by the server, the target image to obtain the face image under the condition that the speech information is determined to be the same as the speech password;

calculating, by the server, a similarity between the speech information and a preset voiceprint model, and calculates a similarity between the face image and a preset face model;

judging, by the server, whether the voiceprint similarity reaches a first preset value or not, and judges whether the face similarity reaches a second preset value or not, wherein the voiceprint similarity is the calculated similarity between the speech information and the preset voiceprint model, and the face similarity is the calculated similarity between the face image and the preset face model; and sending, by the server, the first authentication response and a judgment result to the client under the condition that the voiceprint similarity is determined to reach the first preset value and the face similarity is determined to reach the second preset value, or sends the second authentication response and the judgment result to the client under the condition that the voiceprint similarity is determined not to reach the first preset value and the face similarity is determined not to reach the second preset value, wherein the first authentication response represents that the user to be authenticated passes authentication, and the second authentication response represents that the user to be authenticated does not pass authentication.

3. The authentication method according to claim 2, further comprising:

judging, by the server, whether the voiceprint similarity reaches a third preset value or not under the condition that the voiceprint similarity is determined not to reach the first preset value and the face similarity is determined to reach the second preset value, wherein sending, by the server, the first authentication response and the judgment result to the client under the condition that the voiceprint similarity is determined to reach the third preset value, or sending, by the server, the second authentication response and the judgment result to the client under the condition that the voiceprint similarity is determined not to reach the third preset value, wherein the third preset value is smaller than the first preset value; or judging, by the server, whether the face similarity reaches a fourth preset value or not under the condition that the voiceprint similarity is determined to reach the first preset value and the face similarity is determined not to reach the second preset value, wherein sending, by the server, the first authentication response and the judgment result to the client under the condition that the face similarity is determined to reach the fourth preset value, or sending, by the server, the second authentication response and the judgment result to the client under the condition that the face similarity is determined not to reach the fourth preset value, wherein the fourth preset value is smaller than the second preset value.

4. The authentication method according to claim 2, wherein the step that judging, by the server, whether the speech information is the same as the speech password or not comprises that:

acquiring, by the server, character strings which represent the speech information and the speech password respectively;

comparing, by the server, whether the character strings which represent the speech information and the speech password are the same or not; and determining, by the server, that the speech information is the same as the speech password under the condition that the character strings which represent the speech information and the speech password are determined to be the same.

5. The authentication method according to claim 1, after the step that sending, by the client, the authentication content to the server and before the client receives the authentication response from the server, further comprising:

calculating, by the server, a time interval between a second moment and the first moment, wherein the second moment is time when the server receives the authentication content;

judging, by the server, whether the time interval is shorter than a preset time length or not; and processing, by the server, the speech password and the authentication content under the condition that the time interval is determined to be shorter than the preset time length.

6. The authentication method according to claim 1, after the step that receiving, by the client, the speech password from the server, further comprising:

monitoring, by the client, a mouth area of the user to be authenticated, wherein acquiring, by the client, the speech information under the condition that the mouth area is monitored to change, and acquiring the face image in the speech information acquisition process.

7. The authentication method according to claim 1, wherein the face image comprises at least two face images, and the step that the client judges whether the face image is valid comprises that:

calculating, by the client, a similarity between the at least two face images;

judging, by the client, whether the similarity between the at least two face images reaches a fifth preset value or not; and determining, by the client, that the face images are valid under the condition that the similarity between the at least two face images is determined to reach the fifth preset value.

8. The authentication method according to claim 1, wherein a format of the speech password is a text format, a format of both the speech information and the speech information fragment is an audio format and a format of the face image is a picture format, wherein the step that judging, by the client, whether the speech information is the same as the speech password or not comprises that: acquiring, by the client, the character strings which represent the speech information and the speech password respectively, comparing whether the character strings which represent the speech information and the speech password are the same or not, and determining that the speech information is the same as the speech password under the condition that the character strings which represent the speech information and the speech password are determined to be the same; and the step that associating, by the client, the speech information fragment to the face image under the condition that the speech information is determined to be the same as the speech password and the face image is determined to be valid comprises that: converting, by the client, the speech information fragment into a speech text picture, and superimposing the speech text picture to the face image.

9. A user biological feature authentication system, comprising a client and a server, wherein the client comprises a first hardware processor coupled with a first memory and is configured to execute first program units stored on the first memory, wherein the first program units comprise:
- a first sending unit, configured to send an authentication request to the server;
- a first receiving unit, configured to receive a speech password from the server;
- an acquisition unit, configured to acquire speech information of a user to be authenticated, and acquire a face image of the user to be authenticated in a speech information acquisition process;
- a first judgment unit, configured to judge whether the speech information is the same as the speech password or not, and judge whether the face image is valid;
- an association unit, configured to associate a speech information fragment to the face image under the condition that the speech information is determined to be the same as the speech password and the face image is determined to be valid, wherein the speech information fragment is a part of the speech information acquired within a first time, the first time comprises a second time and the second time is acquisition time of the face image;
- a first calculation unit, configured to calculate a digest value of the speech password, the speech information, a target image, associated information between the target image and the speech information fragment and a first moment to obtain a first digest value by adopting a preset algorithm, wherein the target image is a face image associated with the speech information fragment and the first moment is time when the server receives the authentication request;
- a second sending unit, configured to send an authentication content to the server, wherein the authentication content comprises the speech information, the target image, the associated information and the first digest value; and
- a second receiving unit, configured to receive an authentication response from the server, wherein the authentication response is a processing result, obtained by the server, of the speech password and the authentication content.

10. The authentication system according to claim 9, wherein the authentication response comprises a first authentication response and a second authentication response, and the server comprises a second hardware processor coupled with a second memory and configured to execute second program units stored on the second memory, wherein the second program units comprise:
- a second calculation unit, configured to recalculate a digest value of the speech password, the speech information, the target image, the associated information and the first moment to obtain a second digest value by adopting the preset algorithm;
- a second judgment unit, configured to judge whether the first digest value is the same as the second digest value or not;
- a third judgment unit, configured to judge whether the speech information is the same as the speech password or not under the condition that the first digest value is determined to be the same as the second digest value;
- a restoration unit, configured to restore the target image to obtain the face image under the condition that the speech information is determined to be the same as the speech password;
- a third calculation unit, configured to calculate a similarity between the speech information and a preset voiceprint model, and calculate a similarity between the face image and a preset face model;
- a fourth judgment unit, configured to judge whether the voiceprint similarity reaches a first preset value or not, and judge whether the face similarity reaches a second preset value or not, wherein the voiceprint similarity is the calculated similarity between the speech information and the preset voiceprint model, and the face similarity is the calculated similarity between the face image and the preset face model; and
- a third sending unit, configured to send the first authentication response and a judgment result to the client under the condition that the voiceprint similarity is determined to reach the first preset value and the face similarity is determined to reach the second preset value, or send the second authentication response and the judgment result to the client under the condition that the voiceprint similarity is determined not to reach the first preset value and the face similarity is determined not to reach the second preset value, wherein the first authentication response represents that the user to be authenticated passes authentication, and the second authentication response represents that the user to be authenticated does not pass authentication.

11. The authentication system according to claim 10, wherein
the fourth judgment unit is further configured to judge whether the voiceprint similarity reaches a third preset value or not under the condition that the fourth judgment unit determines that the voiceprint similarity does not reach the first preset value and the face similarity reaches the second preset value, wherein the third sending unit is further configured to send the first authentication response and the judgment result to the client under the condition that the fourth judgment unit determines that the voiceprint similarity reaches the third preset value, or the third sending unit is further configured to send the second authentication response and the judgment result to the client under the condition that the fourth judgment unit determines that the voiceprint similarity does not reach the third preset value, wherein the third preset value is smaller than the first preset value; or
the fourth judgment unit is further configured to judge whether the face similarity reaches a fourth preset value or not under the condition that the fourth judgment unit determines that the voiceprint similarity reaches the first preset value and the face similarity does not reach the second preset value, wherein the third sending unit is further configured to send the first authentication response and the judgment result to the client under the condition that the fourth judgment unit determines that the face similarity reaches the fourth preset value, or the third sending unit is further configured to send the second authentication response and the judgment result to the client under the condition that the fourth judgment unit determines that the face similarity does not reach the fourth preset value, wherein the fourth preset value is smaller than the second preset value.

12. The authentication system according to claim 10, wherein the third judgment unit comprises:

a first acquisition subunit, configured to acquire character strings which represent the speech information and the speech password respectively;

a first comparison subunit, configured to compare whether the character strings which represent the speech information and the speech password are the same or not; and a first determination subunit, configured to determine that the speech information is the same as the speech password under the condition that the first comparison subunit determines that the character strings which represent the speech information and the speech password are the same.

13. The authentication system according to claim 9, wherein the second program unit further comprises:

a fourth calculation unit, configured to calculate a time interval between a second moment and the first moment, wherein the second moment is time when the server receives the authentication content;

a fifth judgment unit, configured to judge whether the time interval is shorter than a preset time length or not; and a processing unit, configured to process the speech password and the authentication content under the condition that the fifth judgment unit determines that the time interval is shorter than the preset time length.

14. The authentication system according to claim 9, wherein the first program units further comprise:

a monitoring unit, configured to monitor a mouth area of the user to be authenticated, wherein the acquisition unit acquires the speech information under the condition that the monitoring unit monitors that the mouth area changes, and acquires the face image in the speech information acquisition process.

15. The authentication system according to claim 9, wherein the face image comprises at least two face images, and the first judgment unit comprises:

a calculation subunit, configured to calculate a similarity between the at least two face images;

a judgment subunit, configured to judge whether the similarity between the at least two face images reaches a fifth preset value or not; and a second determination subunit, configured to determine that the face images are valid under the condition that the judgment subunit determines that the similarity between the at least two face images reaches the fifth preset value.

16. The authentication system according to claim 9, wherein a format of the speech password is a text format, a format of both the speech information and the speech information fragment is an audio format and a format of the face image is a picture format, wherein the first judgment unit further comprises: a second acquisition subunit, a second comparison subunit and a third determination subunit, wherein the second acquisition subunit is configured to acquire the character strings which represent the speech information and the speech password respectively, the second comparison subunit is configured to compare whether the character strings which represent the speech information and the speech password are the same or not, and the third determination subunit is configured to determine that the speech information is the same as the speech password under the condition that the second comparison subunit compares that the character strings which represent the speech information and the speech password are the same; and the association unit comprises: a conversion unit and a superimposition unit, wherein the conversion subunit is configured to convert the speech information fragment into a speech text picture, and the superimposition unit is configured to superimpose the speech text picture to the face image.

\* \* \* \* \*